(12) United States Patent
Xu et al.

(10) Patent No.: US 8,771,620 B2
(45) Date of Patent: Jul. 8, 2014

(54) METHOD FOR RECYCLING LEAD FROM WASTE GLASS CONTAINING LEAD

(75) Inventors: Kaihua Xu, Shenzhen (CN); Miaomiao Guo, Shenzhen (CN); Xianda He, Shenzhen (CN); Xiaokui Liang, Shenzhen (CN)

(73) Assignee: Shenzhen Gem High-Tech Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/814,477

(22) PCT Filed: Oct. 27, 2010

(86) PCT No.: PCT/CN2010/078160
§ 371 (c)(1),
(2), (4) Date: Feb. 5, 2013

(87) PCT Pub. No.: WO2012/019383
PCT Pub. Date: Feb. 16, 2012

(65) Prior Publication Data
US 2013/0129585 A1    May 23, 2013

(30) Foreign Application Priority Data
Aug. 9, 2010  (CN) .......................... 2010 1 0249152

(51) Int. Cl.
*C22B 3/00*  (2006.01)

(52) U.S. Cl.
USPC .............................................. 423/92; 423/95

(58) Field of Classification Search
USPC ...................................................... 423/92, 95
See application file for complete search history.

(56) References Cited

U.S. PATENT DOCUMENTS 5,350,121 A * 9/1994 Vitunac et al. ................... 241/14
6,666,904 B1 * 12/2003 Lough ............................. 75/743

FOREIGN PATENT DOCUMENTS

JP  2004-231490  *  8/2004

\* cited by examiner

*Primary Examiner* — Steven Bos
(74) *Attorney, Agent, or Firm* — Shimokaji & Associates P.C.

(57) ABSTRACT

Disclosed is a method for recycling lead from waste glass containing lead, which comprises the following steps: mechanical crushing waste glass containing lead, ball milling and screening to obtain glass powder containing lead; alkaline roasting the glass powder containing lead to obtain a roasted material; mixing polycarboxylic acid complexant and nitric acid to produce leaching agent, and then placing the roasted material into the leaching agent to obtain leachate; regulating pH value of the leachate to solidify metal ion to obtain precipitate, separating and removing impurities, rinsing and drying to obtain chemical product containing lead. The method avoids environment pollution caused by waste glass containing lead.

18 Claims, 3 Drawing Sheets

METHOD FOR RECYCLING LEAD FROM WASTE GLASS CONTAINING LEAD

PRIORITY INFORMATION

The present application claims priority to Chinese Application No. 201010249152.7, entitled Method for Treating Waste Glass Containing Lead, filed on Aug. 9, 2010, the entire contents of which are hereby incorporated by reference.

FIELD OF THE INVENTION

The present invention relates to method for treating industrial waste, more particularly, relates to a method for treating waste glass containing lead.

BACKGROUND OF THE INVENTION

Glass containing lead refers to glass containing glass-formers like $SiO_2$ and high level of PbO, which is often used for manufacturing products as optical glass, electric vacuum glass, low-temperature sealing glass, anti-radiation glass, glass beads with high refractive index and art container glass, etc.

As an important product of glass containing lead, cathode ray tube (CRT) is widely used in televisions, computer monitors, oscilloscope and other electronic equipments. Glass of CRT monitor contains a lot of PbO as well as a variety of harmful chemical ingredients, such as: 53.05% $SiO_2$, 18.27% PbO, 3.47% $Al_2O_3$, 2.35% CaO, 1.9% BaO and 0.97% MgO (by mass fraction). Especially the glass of the funnel contains lead up to 20% to 40%. If discarded directly, it may not only cause a waste of lead resources, but also produce huge pollution to the surrounding environment, even serious harm to human health.

Because CRT displays produced in early days have reached or are about to reach the service life, and electronic technology products update at a fast speed, more and more CRT displays are (will be) obsolete and become e-waste. According to a statistics in 2008, the number of obsolete televisions and computers in China was over 500 million each year, and increased at the rate of 25 to 30% year by year. Thus, how to treat waste glass containing lead has become a hot issue of concern.

In recent years, it has been reported that sintered glass ceramics can be obtained after mixing glass containing lead and some industrial wastes followed by grinding into powders and sintering, but in this way, it is just to transfer metal lead in the glass from one product to another product, the problem of hazard of heavy metals has not been solved.

In 2008, Wu Guoqing, et al, reported a research entitled "study on technique for recycling and treating displays containing CRT" from the perspective of material classification, harmless disposal of material, material separation and recycle. That same year, Yin Fengfu, et al, at the Haier Group's technology research and development center reported a research entitled "environmental processing technology of waste displays", as well as its partner Qingdao Xintiandi developed CRT comprehensive utilization technology, built relevant disposal and recycling factories, but their technical core is limited to CRT dismantling and classification, and does not involve in industrial production methods of extracting lead from CRT for reuse.

A Chinese patent having publication No. CN 101613802A provided a process and corresponding equipments for recycling waste glass containing lead while producing environmental building material, which takes waste glass containing lead as raw material, recycling lead therein by vacuum carbothermic reduction process and preparing foam glass. However, the process has fewer steps so it can only recycle lead and corresponding chemical product at the same time, and the process should be carried out at 1000° C. for several hours which not only requires high demands for equipments but also causes large scale energy consumption and pollution, so it is not suitable for industrial production.

SUMMARY OF THE INVENTION

Solving the above problems, the present invention aims to provide a method for treating waste glass containing lead, which can not only reduce or eliminate harmful effects of lead on environment, but also turn waste into treasure, by effectively using metal lead in waste to obtain good economic benefit, and it is reasonable and feasible, of less pollution, and can be industrialized.

The present invention provides a method for treating waste glass containing lead, comprising:

(1) providing glass containing lead, mechanically crushing, ball milling and sieving the glass containing lead to obtain glass containing lead powders;

(2) roasting the glass containing lead powders with alkaline liquor to obtain a roasted material;

(3) providing polycarboxylic acid complexing agent and nitric acid, mixing the polycarboxylic acid complexing agent and nitric acid to produce leaching agent, immersing the roasted material in the leaching agent to obtain leachate;

(4) regulating pH value of the leachate, precipitating metal ion to obtain precipitates, separating the precipitates and liquid from the leachate for removing impurities, rinsing and drying the precipitates to obtain chemical product containing lead.

Herein, the glass containing lead has a formula of $R_mO_n$—PbO—$SiO_2(B_2O_3)$. In the formula, $SiO_2(B_2O_3)$, i.e. silica (diboron trioxide), is network former which is a basic unit of the network structure of glass. $R_mO_n$, represents metallic compounds of alkali, metallic compounds of alkaline earth metal, or metallic compounds of rare-earth metal, is modifier that alters the network structure to obtain an adjusted property. PbO, i.e. lead oxide, is the characteristic constituent giving glass basic properties. With the increasing amount of PbO, the values of performance indexes of glass, such as density, refractive index, dispersion, dielectric constant, X-ray absorption coefficient and γ-ray absorption coefficient increase, but its rigidity, viscosity at high temperature, softening temperature and chemical stability decrease; resulting in more slowly changing of viscosity with temperature, colorants of bright-colored, increase of surface brightness, and crisp sounds.

Preferably, glass containing lead is glass of CRT (cathode-ray tube) displays, whose face mainly made from a series of $SiO_2$—BaO—SrO—$ZrO_2$—$R_2O$—RO glass, funnel and neck mainly made from a series of $SiO_2$—$Al_2O_3$—PbO—$R_2O$—RO glass. $R_2O$ and RO are metallic oxides, where R can be Mg, Ca, Na or other metals elements.

Step (1) of the present invention is a pretreatment with material: providing glass containing lead as raw material, mechanically preliminarily crushing glass containing lead, then further crushing glass containing lead with ball-milling machine, collecting glass containing lead powders and sieving for later use. Preferably, the glass containing lead is preliminarily crushed into particle size of 1 to 5 cm, then followed by further crushing and passing through a 50~100 mesh sieve. More preferably, the glass containing lead is preliminarily crushed into particle size of 1 to 3 cm, then followed by further crushing and passing through an 80~100 mesh sieve.

Roasting with alkaline liquor of step (2) refers to steps of harmonizing glass containing lead powders obtained from step (1) with alkaline liquor to obtain paste, roasting the paste to obtain a roasted material. These steps are carried out for breaking the network structure of glass, and setting PbO wrapped in the network structure free.

Preferably, alkaline liquor used in the step of roasting with alkaline liquor is strongly alkaline liquor. Sodium carbonate and sodium nitrate are also available, but they cannot offer better results compared to strongly alkaline liquor. More preferably, said strongly alkaline liquor is NaOH. Preferably, glass containing lead powders used in the step of roasting with alkaline liquor, is mixed with alkaline liquor according to mass ratio of glass containing lead powders to solid NaOH 1:1, and harmonizing to be paste.

The chemical equation for the roasting reaction can be denoted as: $SiO_2 + 2NaOH \rightarrow Na_2SiO_3 + H_2O$ Preferably, the roasting temperature is in the range of 500° C. to 700° C. Preferably, the roasting time is in the range of 30 min to 5 h. More preferably, roasting temperature is 600° C. More preferably, roasting time is 3 h. What is also preferred is that step (2) further comprises grinding the roasted material and passing through an 80 mesh sieve.

Immersing of step (3) mainly refers to process of dissolving PbO wrapped in the network structure of glass in a proper leaching agent, which comprises steps of providing polycarboxylic acid complexing agent and nitric acid, mixing to produce leaching agent, immersing the roasted material obtained from step (2) in the leaching agent to obtain leachate.

The leaching agent is selected depending on capacity for complexing of polycarboxylic acid complexing agent and strong acidity of nitric acid. For the complexation reaction, equilibrium constant is expressed as stability constant of complexes (also known as formation constant of complexes), a greater value of the constant indicates a more stable complex can be formed. As used in the present invention, the term "polycarboxylic acid complexing agent" refers to carboxylic acids which have capacity for complexing, commonly have capacity for complexing with $Pb^{2+}$. Both acetic acid and edetic acid (EDTA) having greater stability constant of complex (with $Pb^{2+}$) are preferred in the present invention. These two polycarboxylic acid complexing agents have strong capacity for complexing, thus can form stable complexes with metal lead. Polycarboxylic acid complex can also be selected from glycine, methanoic acid, glycolic acid, pyruvic acid, lactic acid, malic acid and others, but their capacities for complexing are not good enough.

Preferably, polycarboxylic acid complexing agent is acetic acid, which mixed with nitric acid according to the volume ratio of 3:1 to 9. More preferably, acetic acid is mixed with nitric acid according to the volume ratio of 1:1. Preferably, the concentration of acetic acid is 17 mol/L, the concentration of nitric acid is 15 mol/L.

Step of immersing the roasted material can comprise providing the roasted material and adding water, then placing into leaching agent and immersing. Alternatively, step of immersing the roasted material can comprise placing the roasted material into diluted leaching agent and immersing.

Preferably, placing the roasted material obtained from step (2) into water according to the solid-liquid ratio of roasted material to water ranged from 1:4 to 6, and adding leaching agent according to the solid-liquid ratio of roasted material to nitric acid in the range of 1:1 to 4, and immersing.

More preferably, placing the roasted material obtained from step (2) into water according to the solid-liquid ratio of roasted material to water 1:5, and adding leaching agent according to the solid-liquid ratio of roasted material to nitric acid 1:3, and immersing, herein, volume ratio of acetic acid to nitric acid in leaching agent is 1:1, at the same time, providing 1 portion of roasted material, adding 5 portions of water, 3 portions of acetic acid and 3 portions of nitric acid, mixing and immersing; Alternatively, providing 3 portions of acetic acid, 3 portions of nitric acid and 5 portions of water, mixing to obtain diluted leaching agent, then placing 1 portion of roasted material into the leaching agent and immersing.

The chemical equations for immersing reaction can be denoted as:

$Na_2SiO_3 + 2HNO_3 \rightarrow H_2SiO_3 + 2NaNO_3$ $2PbO + 2HAc \rightarrow Pb(OH)_2 \cdot Pb(Ac)_2$ $PbO + 2HNO_3 \rightarrow Pb(NO_3)_2 + H_2O$ Step of immersing is carried out for lead to be immersed into leachate: lead that has not yet been set free is set free by complexing little by little due to a strong complexing interaction of acetate ion with lead.

Preferably, immersing temperature is in the range of 60° C. to 100° C. Preferably, immersing time is in the range of 1 to 5 h. More preferably, immersing temperature is 90° C. More preferably, immersing time is 4 h. What is also preferred is that step (3) further comprises filtrating leachate and rinsing.

Step (4) comprises: regulating pH value of leachate; precipitating Pb, Ba and other metal ions in leachate in one step or stepwise to obtain precipitates; separating and removing impurities, rinsing and drying to obtain chemical product containing lead.

Preferably, after said precipitates formed from metal ions are obtained, step (4) further comprises steps of transforming precipitates, and then separating and removing impurities.

More preferably, step (4) comprises: (a1) adding strongly alkaline liquor into leachate, regulating pH value of the leachate to 1-3, adding $SO_4^{2-}$ into leachate, precipitating $Pb^{2+}$ and $Ba^{2+}$ to obtain $PbSO_4$ and $BaSO_4$ precipitates; (a2) adding $CO_3^{2-}$ into the leachate containing the $PbSO_4$ and $BaSO_4$ precipitates as obtained in step (a1), transforming said $PbSO_4$ precipitate into $PbCO_3$ precipitate; (a3) adding $HNO_3$ solution into the leachate containing the $PbCO_3$ and $BaSO_4$ precipitates as obtained in step (a2), reacting $PbCO_3$ with $HNO_3$ to obtain a solution containing $Pb(NO_3)_2$ and $BaSO_4$ precipitate; (a4) filtrating the solution containing $Pb(NO_3)_2$ and $BaSO_4$ precipitate as obtained in step (a3), separating solid ($BaSO_4$ precipitate) and liquid ($Pb(NO_3)_2$ solution) for removing impurities; (a5) taking filtrate liquid ($Pb(NO_3)_2$ solution) as obtained in step (a4) and adding $SO_4^{2-}$ to precipitate $Pb^{2+}$ to obtain $PbSO_4$ precipitate; (a6) adding strongly alkaline liquor into the solution containing the $PbSO_4$ precipitate as obtained in step (a5) to regulate pH value to 8-10 to produce $3PbO \cdot PbSO_4 \cdot H_2O$ (tribasic lead sulfate), rinsing, and drying the obtained product $3PbO \cdot PbSO_4 \cdot H_2O$ (tribasic lead sulfate).

The chemical equations can be denoted as:

the first precipitation: $Pb^{2+} + SO_4^{2-} \rightarrow PbSO_4$ $Ba^{2+} + SO_4^{2-} \rightarrow BaSO_4$ transformation of precipitates: $PbSO_4 + CO_3^{2-} \rightarrow PbCO_3 + SO_4^{2-}$ dissolving of precipitates: $PbCO_3 + 2HNO_3 \rightarrow Pb(NO_3)_2 + H_2O + CO_2$ the second precipitation: $Pb^{2+}+SO_4^{2-}\to PbSO_4$ synthesis of product: $4PbSO_4+6OH^-\to 3PbO\cdot PbSO_4\cdot H_2O+3SO_4^{2-}+2H_2O$ And more preferably, step (4) comprises: (a1) adding 20% sodium hydroxide solution into leachate, regulating pH value of the leachate to 1; adding $SO_4^{2-}$ into leachate according to the ratio of $n(SO_4^{2-}):n(Pb^{2+})=1.2\sim1.5:1$, precipitating $Pb^{2+}$ and $Ba^{2+}$ to obtain $PbSO_4$ and $BaSO_4$ precipitates; (a2) adding $CO_3^{2-}$ into the leachate containing the $PbSO_4$ and $BaSO_4$ precipitates as obtained in step (a1) according to the ratio of $n(CO_3^{2-}):n(Pb^{2+})=2\sim2.5:1$, transforming $PbSO_4$ precipitate into $PbCO_3$ precipitate; (a3) adding $HNO_3$ solution into the leachate containing the $PbCO_3$ and $BaSO_4$ precipitates as obtained in step (a2), reacting $PbCO_3$ with $HNO_3$ to obtain a solution containing $Pb(NO_3)_2$ and $BaSO_4$ precipitate; (a4) filtrating the solution containing $Pb(NO_3)_2$ and $BaSO_4$ precipitate as obtained in step (a3), separating solid ($BaSO_4$ precipitate) and liquid ($Pb(NO_3)_2$ solution) for removing impurities; (a5) proving filtrate liquid ($Pb(NO_3)_2$ solution) as obtained in step (a4) and adding $SO_4^{2-}$ according to the ratio of $n(SO_4^{2-}):n(Pb^{2+})=1.2\sim1.5:1$ to precipitate $Pb^{2+}$ to obtain highly purified $PbSO_4$; (a6) adding 20% NaOH solution into the solution containing the $PbSO_4$ precipitate as obtained in step (a5) to regulate pH value to 9 to produce $3PbO\cdot PbSO_4\cdot H_2O$ (tribasic lead sulfate), rinsing, and drying the obtained product $3PbO\cdot PbSO_4\cdot H_2O$ (tribasic lead sulfate).

Alternatively, step (4) preferably further comprises: (b1) regulating the pH value of leachate to 11-12; precipitating $Pb^{2+}$ to obtain $Pb(OH)_2$ precipitate; (b2) filtrating the leachate containing the $Pb(OH)_2$ precipitate as obtained in step (b1), separating solid which is containing, $Pb(OH)_2$ precipitate and liquid for removing impurities; (b3) taking solid dregs which is containing $Pb(OH)_2$ precipitate as obtained in step (b2), adding $HNO_3$ solution into the solid dregs which is containing $Pb(OH)_2$ precipitate to regulate pH value to 0.5-1, reacting $Pb(OH)_2$ with $HNO_3$ to obtain a solution containing $Pb(NO_3)_2$; (b4) adding $SO_4^{2-}$ into the solution containing $Pb(NO_3)_2$ as obtained in step (b3) to precipitate $Pb^{2+}$ to obtain $PbSO_4$; (b5) adding strongly alkaline liquor into the solution containing the $PbSO_4$ precipitate as obtained in step (b4) to regulate pH value to 8-10 to produce $3PbO\cdot PbSO_4\cdot H_2O$ (tribasic lead sulfate), rinsing, and drying the obtained product $3PbO\cdot PbSO_4\cdot H_2O$ (tribasic lead sulfate). Herein, leachate may contain $Al^{3+}$, $Mg^{2+}$ and $Ca^{2+}$ metal ions, which are precipitated to form $Al(OH)_3$, $Mg(OH)_2$ and $Ca(OH)_2$ precipitates at pH 11-12. When solid and liquid are separated, the purpose of separating the above precipitates and $Ba^{2+}$ is achieved.

The chemical equations can be denoted as:

the first precipitation: $M^{n+}+nOH^-\to M(OH)n$ (M stands for Pb, may contain Al, Mg and Ca)

dissolving of precipitates: $M(OH)n+nHNO_3\to M(NO_3)n+nH_2O$ the second precipitation: $Pb^{2+}+SO_4^{2-}\to PbSO_4$ synthesis of product: $4PbSO_4+6OH^-\to 3PbO\cdot PbSO_4\cdot H_2O+3SO_4^{2-}+2H_2O$ More preferably, step (4) comprises: (b1) adding NaOH to regulate the pH value of the leachate to 12; precipitating $Pb^{2+}$ to obtain $Pb(OH)_2$ precipitate; (b2) filtrating the leachate containing the $Pb(OH)_2$ precipitate as obtained in step (b1), separating solid which is containing $Pb(OH)_2$ precipitate and liquid for removing impurities; (b3) taking solid dregs which is containing $Pb(OH)_2$ precipitate as obtained in step (b2), adding $HNO_3$ solution into the solid dregs which is containing $Pb(OH)_2$ precipitate to regulate pH value to 1, reacting $Pb(OH)_2$ with $HNO_3$ to obtain a solution containing $Pb(NO_3)_2$; (b4) adding $SO_4^{2-}$ into the solution containing $Pb(NO_3)_2$ as obtained in step (b3) according to the ratio of $n(SO_4^{2-}):n(Pb^{2+})=1.5\sim2:1$ to precipitate $Pb^{2+}$ to obtain $PbSO_4$; (b5) adding 20% NaOH solution to regulate pH value to 9 to produce $3PbO\cdot PbSO_4\cdot H_2O$ (tribasic lead sulfate), rinsing, and drying the obtained product $3PbO\cdot PbSO_4\cdot H_2O$ (tribasic lead sulfate).

Herein, step of adding NaOH to regulate pH value to 12 is preferably carried out as follows: adding solid NaOH to regulate pH value to 6, then adding 10 mol/L NaOH solution to regulate pH value to 12 so as to avoid inaccurate regulation that may occur when solid NaOH is directly used to regulate the pH value at terminal point.

Chemical product containing Pb obtained in the present invention, $3PbO\cdot PbSO_4\cdot H_2O$, can be widely used in manufacturing heat stabilizer, wire and cable, and the process is of good matching, have high economic value in use.

The method for recycling lead from waste glass containing lead provided in the present invention has the following beneficial effects.

(1) Treating waste CRT reasonably, so as to reduce or eliminate harmful effects of lead on environment.

(2) Turning waste into treasure, effectively using metal lead in waste to produce chemical product containing lead of wide range of uses, good economic benefit, using lead-free dross to produce other useful functional material.

(3) Reasonable and feasible, less pollution, being industrialized.

DETAILED DESCRIPTION OF ILLUSTRATED EMBODIMENTS

Figure 1:
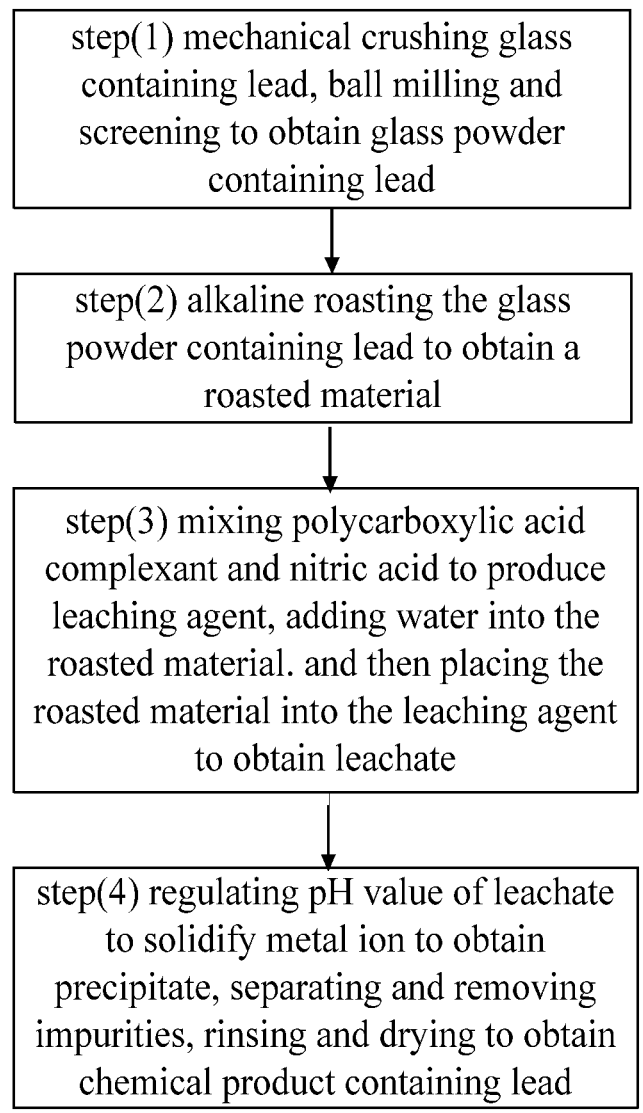
FIG. 1 is a flow chart of the present invention.

The following description will depict preferred embodiments of the present invention in more detail. It should be noted that, those skilled in the art will recognize that the invention can be practiced with modification within the spirit of the principle, and the modification is also within the scope of protection of the present invention. FIG. 1 is a flow chart of the present invention.

Example 1

Figure 2:
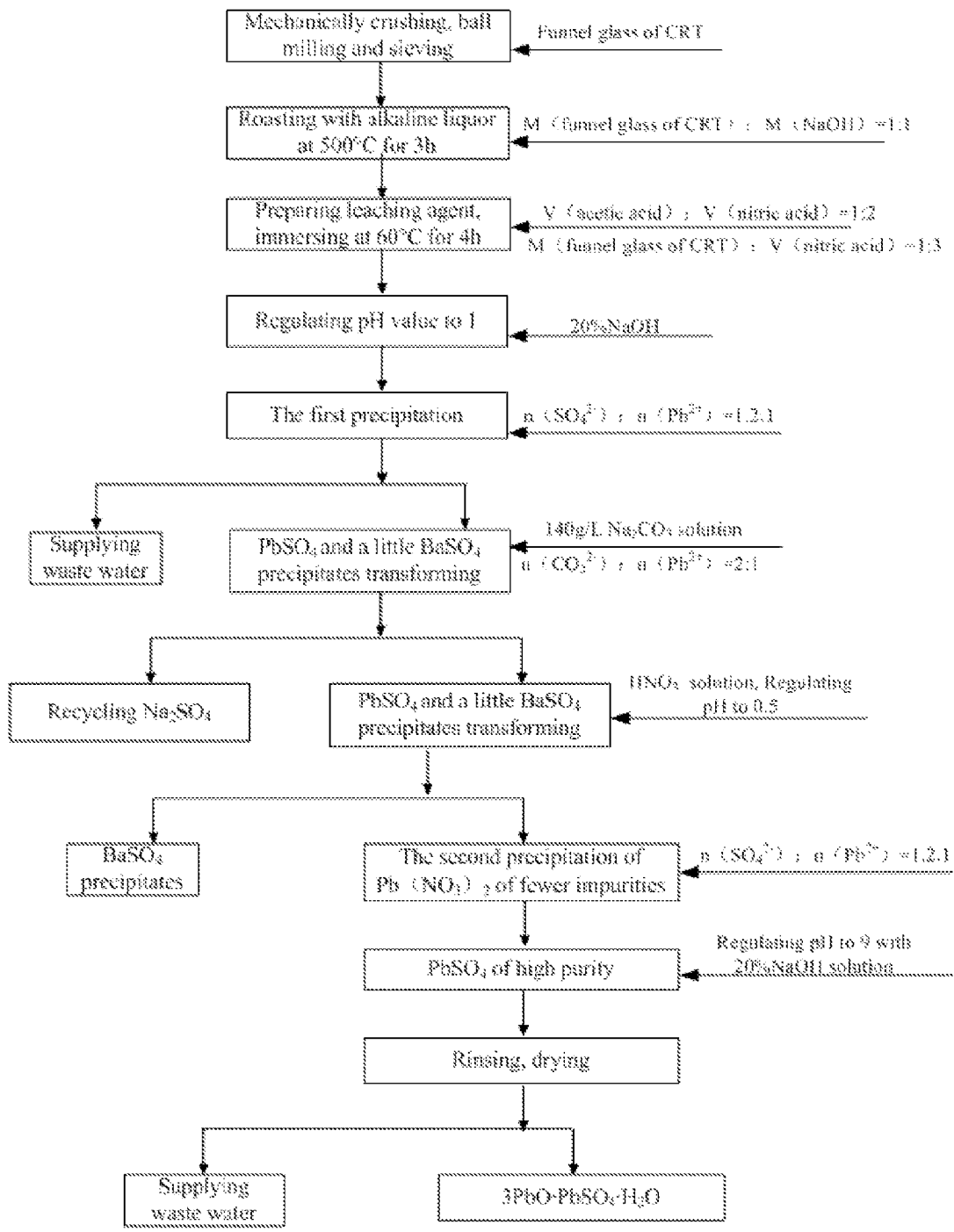
FIG. 2 is flow chart A of the embodiments of the present invention.

As shown in FIG. 2, a method for recycling lead from waste glass containing lead, comprising:

(1) providing glass containing lead, mechanically crushing, ball milling and sieving to obtain glass containing lead powders;

providing funnel glass of CRT as raw material, mechanically preliminarily crushing glass containing lead into particle size of 1 cm, then further crushing funnel glass of CRT with ball milling machine, collecting funnel glass powders of CRT and passing through an 80 mesh sieve for later use;

Components of funnel glass of CRT are tested, the results are shown in Table. 1:

TABLE 1

| | components of funnel glass of CRT | | | | | |
|---|---|---|---|---|---|---|
| | Testing items | | | | | |
| | Pb % | SiO$_2$ % | Al % | Mg % | Ca % | Na % |
| results | 21.43 | 51.3 | 1.58 | 0.081 | 0.046 | 11.45 |

(2) roasting glass containing lead powders with alkaline liquor to obtain a roasted material Providing solid NaOH and mixing with funnel glass of CRT according to mass ratio of 1:1, harmonizing with water to obtain paste; roasting the paste at 500° C. for 3 h to obtain a roasted material. These steps are carried out for breaking the network structure of glass, and setting PbO wrapped in the network structure free.

(3) providing acetic acid and nitric acid, mixing to produce leaching agent, immersing the roasted material in the leaching agent to obtain leachate Providing 75 mL of acetic acid (17 mol/L) and 150 mL of nitric acid (15 mol/L), and mixing well to produce leaching agent. Taking 50 g of funnel glass of CRT roasted material, adding 250 mL of water, then placing into leaching agent, immersing at 60° C. for 4 h to obtain leachate. The step of immersing is carried out for dissolving PbO into leaching agent.

(4) regulating pH value of the leachate, precipitating metal ion to obtain precipitates, transforming precipitates, separating and removing impurities, rinsing and drying to obtain chemical product containing lead adding 20% sodium hydroxide solution into leachate, regulating pH value of the leachate to 1; adding K$_2$SO$_4$ into leachate according to the ratio of n(SO$_4^{2-}$):n(Pb$^{2+}$)=1.2, precipitating Pb$^{2+}$ and Ba$^{2+}$ to obtain PbSO$_4$ and BaSO$_4$ precipitates; adding 140 g/L of Na$_2$CO$_3$ solution according to the ratio of n(CO$_3^{2-}$):n(Pb$^{2+}$)=2:1, converting PbSO$_4$ precipitate into PbCO$_3$, adding HNO$_3$ solution, regulating pH value to 0.5, reacting to obtain Pb(NO$_3$)$_2$ with a fairly small amount of impurities; filtrating, separating solid (BaSO$_4$) and liquid (Pb(NO$_3$)$_2$), removing impurities; taking filtrate liquid and adding Na$_2$SO$_4$ according to the ratio of n(SO$_4^{2-}$):n(Pb$^{2+}$)=1.2:1 to precipitate Pb$^{2+}$ to obtain highly purified PbSO$_4$; at last, adding 20% NaOH solution to regulate pH value to 9, rinsing, drying to obtain product 3PbO.PbSO$_4$.H$_2$O (tribasic lead sulfate).

Example 2

Figure 3:
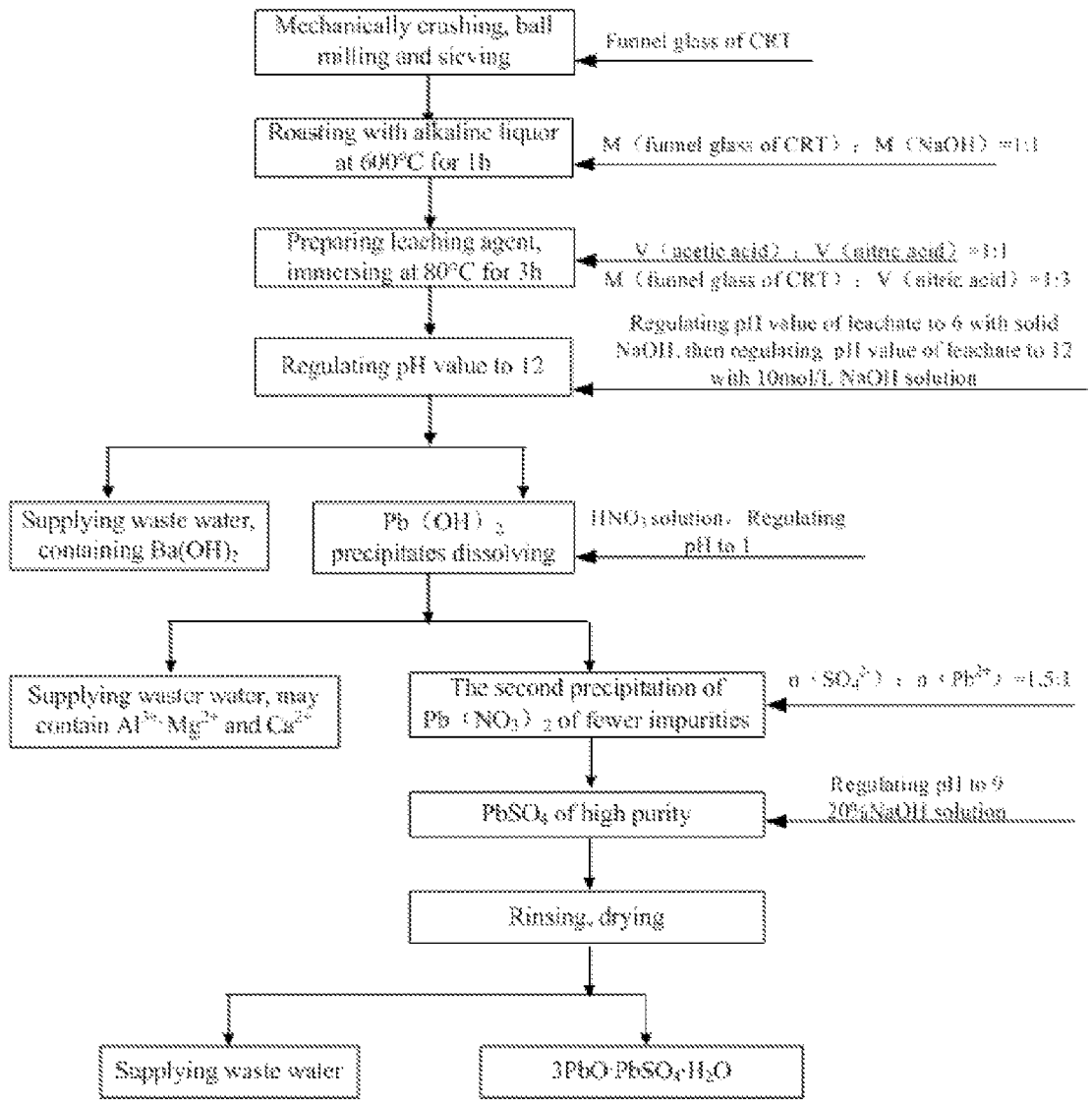
FIG. 3 is flow chart B of the embodiments of the present invention.

As shown in FIG. 3, a method for treating waste glass containing lead, comprising:

(1) providing funnel glass of CRT as raw material, preliminarily mechanically crushing glass containing lead into particle size of 3 cm, then further crushing funnel glass of CRT with ball milling machine, collecting funnel glass powders of CRT and passing through a 100 mesh sieve for later use;

(2) roasting glass containing lead powders with alkaline liquor to obtain a roasted material Providing solid NaOH and mixing with funnel glass of CRT according to mass ratio of 1:1, harmonizing with water to obtain paste; roasting the paste at 600° C. for 13 h to obtain a roasted material. Grinding the roasted material and passing through an 80 mesh sieve These steps are carried out for breaking the network structure of glass, and setting PbO wrapped in the network structure free.

(3) providing acetic acid and nitric acid, mixing to produce leaching agent, immersing the roasted material in the leaching agent to obtain leachate Providing 60 mL of acetic acid (17 mol/L) and 60 mL of nitric acid (15 mol/L), and mixing well to produce leaching agent. Taking 20 g of funnel glass of CRT roasted material, adding 100 mL of water, then placing into leaching agent, immersing at 80° C. for 3 h to obtain leachate. The step of immersing is carried out for dissolving PbO into leaching agent.

(4) regulating pH value of the leachate, precipitating metal ion to obtain precipitates, transforming precipitates, separating and removing impurities, rinsing and drying to obtain chemical product containing lead Adding solid NaOH to regulate pH value of leachate to 6, then adding 10 mol/L NaOH solution to regulate pH value to 12; precipitating Pb$^{2+}$ to obtain Pb(OH)$_2$ precipitate; filtrating, separating solid and liquid, removing impurities; taking solid dregs, adding HNO$_3$ solution to regulate pH value to 1, reacting to obtain Pb(NO$_3$)$_2$; adding Na$_2$SO$_4$ according to the ratio of n(SO$_4^{2-}$):n(Pb$^{2+}$)=1.5:1 to precipitate Pb$^{2+}$ to obtain PbSO$_4$; at last, adding 20% NaOH solution to regulate pH value to 9, rinsing, drying to obtain product 3PbO.PbSO$_4$.H$_2$O (tribasic lead sulfate).

Effect Examples

Method 1

For details about specific steps, see Example 1.

(1) Immersing Experiments

The step of immersing refers to process of dissolving PbO wrapped in the network structure of glass in a proper leaching agent. In the present experiment, glass is previously roasted with alkaline liquor, then immersed out using nitric acid-acetic acid as leaching agent at a certain temperature. The results are shown in Table. 2. Leaching rate can reach more than 95%, content of lead in glass falls below 1% after being treated.

TABLE 2

| | orthogonal table for immersing experiments | | | | | | |
|---|---|---|---|---|---|---|---|
| | Column | | | | Results | | |
| | 1 | 2 | 3 | 4 | | | |
| Factors | Roasting Temp./° C. | Reaction Temp./° C. | HAc/ mL | HNO$_3$/ mL | H$^+$/ mol · L$^{-1}$ | Content of lead in dregs/% | Leaching Rate % |
| Expt. 1 | 500 | 60 | 50 | 50 | 1.81 | 7.8 | 74.99 |
| Expt. 2 | 500 | 80 | 100 | 100 | 3.67 | 1.76 | 95 |
| Expt 3 | 500 | 100 | 150 | 150 | 3.95 | 0.84 | 97.77 |

TABLE 2-continued orthogonal table for immersing experiments

| | Column | | | | Results | |
|---|---|---|---|---|---|---|
| Factors | 1 Roasting Temp./° C. | 2 Reaction Temp./° C. | 3 HAc/ mL | 4 HNO$_3$/ mL | H$^+$/ mol·L$^{-1}$ | Content of lead in dregs/% | Leaching Rate % |
| Expt. 4 | 600 | 60 | 100 | 150 | 4.04 | 1.71 | 94.6 |
| Expt. 5 | 600 | 80 | 150 | 50 | 1.28 | 0.75 | 97.95 |
| Expt. 6 | 600 | 100 | 50 | 100 | 3.69 | 0.59 | 98.26 |
| Expt. 7 | 700 | 60 | 150 | 100 | 4.64 | 0.9 | 96.77 |
| Expt. 8 | 700 | 80 | 50 | 150 | 8.26 | 0.68 | 98.46 |
| Expt. 9 | 700 | 100 | 100 | 50 | 1.2 | 0.8 | 97.95 |

TABLE 3 analytical table for results of orthogonal experiments

| | Column | | | | |
|---|---|---|---|---|---|
| | 1 | 2 | 3 | 4 | |
| | Factors | | | | |
| | Roasting Temp./° C. | Reaction Temp./° C. | HAc/mL | HNO$_3$/mL | Results |
| Expt. 1 | 1 | 1 | 1 | 1 | 74.99 |
| Expt. 2 | 1 | 2 | 2 | 2 | 95 |
| Expt. 3 | 1 | 3 | 3 | 3 | 97.77 |
| Expt. 4 | 2 | 1 | 2 | 3 | 94.6 |
| Expt. 5 | 2 | 2 | 3 | 1 | 97.95 |
| Expt. 6 | 2 | 3 | 1 | 2 | 98.26 |
| Expt. 7 | 3 | 1 | 3 | 2 | 96.77 |
| Expt. 8 | 3 | 2 | 1 | 3 | 98.46 |
| Expt. 9 | 3 | 3 | 2 | 1 | 97.98 |
| Mean value 1 | 89.253 | 88.787 | 90.570 | 90.307 | |
| Mean value 2 | 96.937 | 97.137 | 95.860 | 96.677 | |
| Mean value 3 | 97.737 | 98.003 | 97.497 | 96.943 | |
| Range | 8.484 | 9.216 | 6.927 | 6.636 | |
| Factors arranged in order of importance | reaction temperature > roasting temperature > amount of HAc ≈ amount of HNO$_3$ | | | | |
| Optimal level | 3 (100) | 3 (700) | 3 (150) | 3 (150) | |
| Optimal combination | reaction temperature 3 (100), roasting temperature 3 (700), amount of HAc 3 (150), amount of HNO$_3$ 3 (150) | | | | |

CONCLUSIONS

Optimal combination shown in Table. 3 comprises reaction temperature 3 (100° C.), roasting temperature 3 (700° C.), amount of HAc 3 (150 mL) and amount of HNO$_3$ 3 (150 mL).

However, when applied in practical production, the leaching rate is also very high (97.5%) under the following combination condition: reaction temperature 2 (80° C.), roasting temperature 2 (600° C.), amount of HAc 2 (100 mL) and amount of HNO$_3$ 2 (100 mL).

(2) The First Precipitation

Pb$^{2+}$ and Ba$^{2+}$ in solution are transformed into precipitates, and then separated. Specifically, adding sodium hydroxide into leachate, regulating pH value of leachate; adding SO$_4^{2-}$ into leachate, precipitating Pb$^{2+}$ and Ba$^{2+}$ to obtain PbSO$_4$ and BaSO$_4$ precipitates.

Precipitation rate of Pb$^{2+}$ precipitated by K$_2$SO$_4$ at different acidities are shown in Table. 4:

TABLE 4 precipitation of Pb$^{2+}$ by K$_2$SO$_4$ at different acidities

| Original solution | Precipitated solution | | | | PbSO$_4$ solid precipitates*[1] | | | | Precipitation rate*[2] | | |
|---|---|---|---|---|---|---|---|---|---|---|---|
| H$^+$ mol·L$^{-1}$ | Vol. V$_2$/mL | PbC$_1$/g/L | CaC$_2$'/ mg/L | BaC$_3$'/ mg/L | mass g | Pb % | Ca % | Ba % | Pb % | Ca % | Ba % |
| 0.09 | FL | 0.037 | 433.5 | 0.2 | 3.58 m(M) | 61.02 | 0.02 | 0.85 | 98.07 | 0.26 | 96.59 |
| | 530 m(M) | 0.0199 g | 0.2298 g | 0.0001 g | | 2.03 g | 0.0007 g | 0.0283 g | | | |
| | RW | 0.0275 | 5.6 | 1.2 | | | | | | | |
| | 745 m(M) | 0.0208 g | 0.0417 g | 0.0009 g | | | | | | | |
| 0.38 | FL | 0.4484 | 470.2 | 7.1 | 3.35 m(M) | 62.99 | 0.052 | 0.04 | 88.36 | 0.6 | 22.4 |
| | 500 m(M) | 0.2442 g | 0.2351 g | 0.0036 g | | 2.11 g | 0.0017 g | 0.0013 g | | | |
| | RW | 0.036 | 4.5 | 1.0 | | | | | | | |
| | 940 m(M) | 0.0338 g | 0.0423 g | 0.0009 g | | | | | | | |

TABLE 4-continued precipitation of $Pb^{2+}$ by $K_2SO_4$ at different acidities

| Original solution | Precipitated solution | | | | $PbSO_4$ solid precipitates*1 | | | | Precipitation rate*2 | | |
|---|---|---|---|---|---|---|---|---|---|---|---|
| $H^+$ mol·$L^{-1}$ | Vol. $V_2$/mL | $PbC_1$'/g/L | $CaC_2$'/ mg/L | $BaC_3$'/ mg/L | mass g | Pb % | Ca % | Ba % | Pb % | Ca % | Ba % |
| 1.09 | FL | 1.56 | 477.7 | 7.3 | 2.19 m(M) | 62.27 | 0.048 | 0.01 | 62.41 | 0.6 | 4.17 |
| | 500 m(M) | 0.78 g | 0.2389 g | 0.0037 g | | 1.36 g | 0.0015 g | 0.0002 g | | | |
| | RW | 0.0483 | 7.6 | 1.1 | | | | | | | |
| | 800 m(M) | 0.0386 g | 0.0061 g | 0.0009 g | | | | | | | |
| 2.07 | FL | 2.38 | 432.5 | 7.1 | 1.92 m(M) | 54.41 | 0.01 | 0.0067 | 45.59 | 0.1 | 2.17 |
| | 500 m(M) | 1.19 g | 0.2163 g | 0.0036 g | | 1.04 g | 0.0002 g | 0.0001 g | | | |
| | RW | 0.0552 | 6.1 | 1.0 | | | | | | | |
| | 925 m(M) | 0.0511 g | 0.0056 g | 0.0009 g | | | | | | | |

(FL: filtrate liquid; RW: rinsing water PbSO4 solid precipitates*1: theoretical mass fraction of Pb: 68.33%, containning a few $BaSO_4$, $CaSO_4BaSO_4$, $CaSO_4$
Precipitation rate*2: M precipitates/M (filtrate liquid + rinsing water + precipitates))

Conclusions: $H^+$ concentration has great impact on precipitation of the system, as shown in Table. 4, precipitation rate of Pb reaches 98.07% when the $H^+$ concentration is 0.09, then declines with increasing acidity of the system; when the $H^+$ concentration is 0.38, precipitation rate of Pb is 88.36%, below 90%. Thus, the $H^+$ concentration of the system cannot be too large. In other words, under the premise of guaranteeing a high precipitation rate, acidity of the system must be regulated (increase the pH value to about 1) before precipitating.

(3) Transformation of Precipitates

Preparing HAc—$HNO_3$ solution containing two types of metal ions four times as much as the amount of original filtrate liquid, concentrations of two types of original leached metals are Pb: 30 g/L and Ca: 3 g/L, then regulating pH value of solution to 1, precipitating using $Na_2SO_4$ which is in excess of 1.5 times, filtering and rinsing, then transforming $PbSO_4$ precipitates using 140 g/L of $Na_2CO_3$ solution, rinsing and filtering, at last, dissolving precipitates with $HNO_3$, fixing the pH value of solution at terminal point to be about 1, reacting for 1 h, and the test results are shown in Table. 5:

TABLE 5 effects of excess coefficients of $Na_2CO_3$ on precipitates transformation (transform $PbSO_4$ into $PbCO_3$)
(concentration of $Na_2CO_3$ is 140 g/L, pH value at terminal point is 1)

| Experiment number | Excess Coefficient | Dissolved filtrate liquid | | |
|---|---|---|---|---|
| | | Vol. mL | Pb (g/L) | Ca (g/L) |
| preparation of original $Pb(NO_3)_2$ solution | | 330 mL | 30 g/L 10 g | 3 g/L 1 g |
| 1 | 1.5 | 330 mL mass transformation rate | 33.88 g/L 11.18 g 100% | 20.8 mg/L 0.006864 g 0.6864% |
| 2 | 2 | 190 mL mass transformation rate | 55.05 g/L 10.46 g 100% | 38.6 mg/L 0.007334 g 0.7334% |
| 3 | 2.5 | 220 mL mass transformation rate | 43.67 g/L 9.61 g 96.1% | 33.4 mg/L 0.0735 g 7.35% |

Conclusions: all transformation rates of Pb after being transformed by $Na_2CO_3$ solution of different excess coefficients are greater than 96%.

(4) Synthesis of Product

Synthesis experiment, regulating pH value at terminal point of the system to 9 by using 20% sodium hydroxide solution and results are shown in Table. 6:

TABLE 6 synthesis experiments

| | HG2.1053-77 indexes | | | | | | |
|---|---|---|---|---|---|---|---|
| Indexes | First Grade | Second Grade | Experiments | | | | |
| Appearance | white | white | white | white | white | white | white |
| Total amount of lead (PbO %) | 89.0 ± 1.0 | 89.0 ± 1.5 | 88.9 | 88.62 | 88.5 | 88.6 | 88.5 |
| $SO_3$ (%) | 8.0 ± 0.5 | 8.0 ± 1.0 | 7.6 | 8.3 | 8.4 | 7.8 | 8.7 |
| Conclusions | | | first grade | first grade | first grade | first grade | second grade |

Conclusions: compared to industry standards, the synthesized products meet the standard of first grade product.

Method 2

For details about specific steps, see Example 2.

(1) Immersing Experiment

See Method 1.

(2) Precipitation

Regulating pH value of original filtrate liquid to 10~14 with NaOH, precipitation rates of kinds of metal ions are shown in Table. 7:

TABLE 7 effects of using solid NaOH to regulate pH value at terminal point of leached original solution on precipitates

| | | Pb | Ba | Ca |
|---|---|---|---|---|
| | Original solution (1000 mL) | 3.75 g/L (3.75 g) | 189.0 mg/L (0.189 g) | 128.0 mg/L (0.128 g) |
| pH value = 10 | Filtrate liquid (1840 mL) | 419.6 mg/L (0.772 g) | 87.9 mg/L (0.162 g) | |
| | Rinsing water (1980 mL) | 11.9 mg/L (0.024 g) | 7.0 mg/L (0.01 g) | |
| | Dregs (6.01 g) | 46.03% (2.77 g) | 0.0127% (0.0007 g) | 0.0001% ($6.01 \times 10^{-6}$ g) |
| | Precipitation rate (total) | 77.8% (3.56 g) | 0.4% (0.1727 g) | 0% |
| pH value = 12 | Filtrate liquid (1100 mL) | 48.6 mg/L (0.053 g) | 118.1 mg/L (0.130 g) | |
| | Rinsing water (2500 mL) | 24.7 mg/L (0.0618 g) | 8.0 mg/L (0.02 g) | |
| | Dregs (4.6 g) | 51.76% (2.38 g) | 0.01% (0.0005 g) | 0.0001% ($6.01 \times 10^{-6}$ g) |
| | Precipitation rate (total) | 95.58% (2.49 g) | 0.33% (0.151 g) | 0% |
| pH value = 14 | Filtrate liquid (1100 mL) | 2.75 g/L (3.025 g) | 104.5 mg/L (0.115 g) | |
| | Rinsing water (2500 mL) | 115.4 mg/L (0.2885 g) | 10 mg/L ($2.5 \times 10^{-5}$ g) | |
| | Dregs (2.14 g) | 7.16% (0.153 g) | 0.05% (0.0012 g) | 0.0001% ($2.14 \times 10^{-6}$) |
| | Precipitation rate (total) | 4.41% (3.467 g) | 1.0% (0.1162 g) | 0% |

Precipitation rate = M precipitates/M (filtrate liquid + rinsing water + precipitates)
Precipitation rate (total): the former is precipitation rate, the latter is total amount of metal in equilibrium calculation.

Conclusions: it can be seen from Table. 7 that pH values are too low, precipitation rates of Pb are low; when pH value is 12, precipitation rate of Pb increases, however, when pH value increases to 14, precipitation of Pb declines because $Pb(OH)_2$ can dissolve in strong alkali, thus, the best pH value at terminal point for precipitation is 12.

(3) Dissolving and Precipitation

Data is the same as that of the first precipitation (4) Synthesis of Product

Adding appropriate concentrated $HNO_3$ into slurring wet $Pb(OH)_2$ solution to regulate its pH value to 0.5 to 1, adding $Na_2SO_4$ which is in excess of 1.5~2 times, precipitating to obtain $PbSO_4$, then adding 20% sodium hydroxide to regulate pH value of slurring $PbSO_4$ to 9 to obtain tribasic lead sulfate meeting industry standards, shown in Table. 8:

TABLE 8 quality standard for tribasic lead sulfate products

| | HG2.1053-77 indexes | | trial products | |
|---|---|---|---|---|
| Indexes | First grade | Second grade | Primary try | Secondary try |
| Appearance | white, no obvious mechanical impurities | white and slight yellow, no obvious mechanical impurities | white, no impurities | white, no impurities |

TABLE 8-continued quality standard for tribasic lead sulfate products

| | HG2.1053-77 indexes | | trial products | |
|---|---|---|---|---|
| Indexes | First grade | Second grade | Primary try | Secondary try |
| Total amount of lead (PbO %) | 89.0 ± 1.0 | 89.0 ± 1.5 | 89.3 | 89.3 |
| $SO_3$ (%) | 8.0 ± 0.5 | 8.0 ± 1 | 7.05 | 7.93 |
| Ba (%) | no requirements | no requirements | 0.55 | 0.54 |
| Conclusions | | | second grade | first grade |

Conclusions: process flow of such method is very short, compared to industry standards, the synthesized products meet the standard of first grade product.

Comparing the above two methods, Method 1 is a favorable method for controlling the cost because consumed acid and alkaline liquor are less in the step of "precipitating metal ion to obtain precipitates, separating and removing impurities"; Method 2 is a more simple method because step of transformation of precipitates is omitted.

Chemical product containing Pb of the present invention, $3PbO \cdot PbSO_4 \cdot H_2O$, can be widely used in manufacturing heat stabilizer, wire and cable, and the process is of good matching, have high economic value in use.

What is claimed is:

1. A method for treating waste glass containing lead, comprising:
   (1) providing glass containing lead, mechanically crushing, ball milling and sieving the glass containing lead to obtain glass containing lead powders;
   (2) roasting the glass containing lead powders with alkaline liquor to obtain a roasted material;
   (3) providing polycarboxylic acid complexing agent and nitric acid, mixing the polycarboxylic acid complexing agent and nitric acid to produce leaching agent, immersing the roasted material in the leaching agent to obtain leachate;
   (4) regulating pH value of the leachate, precipitating metal ion to obtain precipitates, separating the precipitates and liquid from the leachate for removing impurities, rinsing and drying the precipitates to obtain chemical product containing lead.

2. The method as claimed in claim 1, wherein, roasting temperature in said step (2) is in the range of 500° C. to 700° C.

3. The method as claimed in claim 2, wherein, roasting temperature in said step (2) is 600° C.

4. The method as claimed in claim 1, wherein, said polycarboxylic acid complexing agent in step (3) is acetic acid or edetic acid.

5. The method as claimed in claim 4, wherein, said polycarboxylic acid complexing agent in step (3) is acetic acid, mixed with nitric acid according to the volume ratio of 3:1 to 9.

6. The method as claimed in claim 1, wherein, immersing time temperature in said step (3) is in the range of 60° C. to 100° C.

7. The method as claimed in claim 6, wherein, immersing time temperature in said step (3) is 80° C.

8. The method as claimed in claim 1, wherein, said step (4) comprises: (a1) regulating pH value of the leachate to 1-3, adding precipitator $SO_4^{2-}$ into the leachate, precipitating $Pb^{2+}$ and $Ba^{2+}$ to obtain $PbSO_4$ and $BaSO_4$ precipitates; (a2) adding $CO_3^{2-}$ into the leachate containing the $PbSO_4$ and $BaSO_4$ precipitates as obtained in step (a1), transforming said $PbSO_4$ precipitate into $PbCO_3$ precipitate, (a3) adding $HNO_3$ solution into the leachate containing the $PbCO_3$ and $BaSO_4$ precipitates as obtained in step (a2), reacting $PbCO_3$ with $HNO_3$ to obtain a solution containing $Pb(NO_3)_2$ and $BaSO_4$ precipitate; (a4) filtrating the solution containing $Pb(NO_3)_2$ and $BaSO_4$ precipitate as obtained in step (a3), separating solid $BaSO_4$ precipitate and liquid $Pb(NO_3)_2$ solution for removing impurities; (a5) taking filtrate liquid $Pb(NO_3)_2$ solution as obtained in step (a4) and adding said precipitator $SO_4^{2-}$ again to precipitate $Pb^{2+}$ to obtain $PbSO_4$ precipitate; (a6) adding strongly alkaline liquor into the solution containing the $PbSO_4$ precipitate as obtained in step (a5) to regulate pH value to 8-10 to produce $3PbO \cdot PbSO_4 \cdot H_2O$, rinsing, and drying the obtained $3PbO \cdot PbSO_4 \cdot H_2O$.

9. The method as claimed in claim 1, wherein, said step (4) comprises: (b1) regulating the pH value of said leachate to 11-12; precipitating $Pb^{2+}$ to obtain $Pb(OH)_2$ precipitate; (b2) filtrating the leachate containing the $Pb(OH)_2$ precipitate as obtained in step (b1), separating solid which is containing $Pb(OH)_2$ precipitate and liquid for removing impurities; (b3) taking solid dregs which is containing $Pb(OH)_2$ precipitate as obtained in step (b2), adding $HNO_3$ solution into the solid dregs which is containing $Pb(OH)_2$ precipitate to regulate pH value to 0.5-1, reacting $Pb(OH)_2$ with $HNO_3$ to obtain a solution containing $Pb(NO_3)_2$; (b4) adding $SO_4^{2-}$ into the solution containing $Pb(NO_3)_2$ as obtained in step (b3) to precipitate $Pb^{2+}$ to obtain $PbSO_4$; (b5) adding strongly alkaline liquor into the solution containing the $PbSO_4$ precipitate as obtained in step (b4) to regulate pH value to 8-10 to produce $3PbO \cdot PbSO_4 \cdot H_2O$, rinsing and drying the obtained $3PbO \cdot PbSO_4 \cdot H_2O$.

10. The method as claimed in claim 9, wherein, said step of regulating pH value of said leachate to 11-12 is carried out as follows: adding solid NaOH to regulate pH value of said leachate to 6, then adding 10 mol/L NaOH solution to regulate pH value of said leachate to 11-12.

11. The method as claimed in claim 2, wherein, said polycarboxylic acid complexing agent in step (3) is acetic acid or edetic acid.

12. The method as claimed in claim 3, wherein, said polycarboxylic acid complexing agent in step (3) is acetic acid or edetic acid.

13. The method as claimed in claim 2, wherein, immersing temperature in said step (3) is in the range of 60° C. to 100° C.

14. The method as claimed in claim 3, wherein, immersing temperature in said step (3) is in the range of 60° C. to 100° C.

15. The method as claimed in claim 2, wherein, said step (4) comprises: (a1) regulating pH value of the leachate to 1-3, adding precipitator $SO_4^{2-}$ into the leachate, precipitating $Pb^{2+}$ and $Ba^{2+}$ to obtain $PbSO_4$ and $BaSO_4$ precipitates; (a2) adding $CO_3^{2-}$ into the leachate containing the $PbSO_4$ and $BaSO_4$ precipitates as obtained in step (a1), transforming said $PbSO_4$ precipitate into $PbCO_3$ precipitate, (a3) adding $HNO_3$ solution into the leachate containing the $PbCO_3$ and $BaSO_4$ precipitates as obtained in step (a2), reacting $PbCO_3$ with $HNO_3$ to obtain a solution containing $Pb(NO_3)_2$ and $BaSO_4$ precipitate; (a4) filtrating the solution containing $Pb(NO_3)_2$ and $BaSO_4$ precipitate as obtained in step (a3), separating solid $BaSO_4$ precipitate and liquid $Pb(NO_3)_2$ solution for removing impurities; (a5) taking filtrate liquid $Pb(NO_3)_2$ solution as obtained in step (a4) and adding said precipitator $SO_4^{2-}$ again to precipitate $Pb^{2+}$ to obtain $PbSO_4$ precipitate; (a6) adding strongly alkaline liquor into the solution containing the $PbSO_4$ precipitate as obtained in step (a5) to regulate pH value to 8-10 to produce $3PbO \cdot PbSO_4 \cdot H_2O$, rinsing, and drying the obtained $3PbO \cdot PbSO_4 \cdot H_2O$.

16. The method as claimed in claim 3, wherein, said step (4) comprises: (a1) regulating pH value of the leachate to 1-3, adding precipitator $SO_4^{2-}$ into the leachate, precipitating $Pb^{2+}$ and $Ba^{2+}$ to obtain $PbSO_4$ and $BaSO_4$ precipitates; (a2) adding $CO_3^{2-}$ into the leachate containing the $PbSO_4$ and $BaSO_4$ precipitates as obtained in step (a1), transforming said $PbSO_4$ precipitate into $PbCO_3$ precipitate, (a3) adding $HNO_3$ solution into the leachate containing the $PbCO_3$ and $BaSO_4$ precipitates as obtained in step (a2), reacting $PbCO_3$ with $HNO_3$ to obtain a solution containing $Pb(NO_3)_2$ and $BaSO_4$ precipitate; (a4) filtrating the solution containing $Pb(NO_3)_2$ and $BaSO_4$ precipitate as obtained in step (a3), separating solid $BaSO_4$ precipitate and liquid $Pb(NO_3)_2$ solution for removing impurities; (a5) taking filtrate liquid $Pb(NO_3)_2$ solution as obtained in step (a4) and adding said precipitator $SO_4^{2-}$ again to precipitate $Pb^{2+}$ to obtain $PbSO_4$ precipitate; (a6) adding strongly alkaline liquor into the solution containing the $PbSO_4$ precipitate as obtained in step (a5) to regulate pH value to 8-10 to produce $3PbO \cdot PbSO_4 \cdot H_2O$, rinsing, and drying the obtained $3PbO \cdot PbSO_4 \cdot H_2O$.

17. The method as claimed in claim 2, wherein, said step (4) comprises: (b1) regulating the pH value of said leachate to 11-12; precipitating $Pb^{2+}$ to obtain $Pb(OH)_2$ precipitate; (b2) filtrating the leachate containing the $Pb(OH)_2$ precipitate as obtained in step (b1), separating solid which is containing $Pb(OH)_2$ precipitate and liquid for removing impurities; (b3) taking solid dregs which is containing $Pb(OH)_2$ precipitate as obtained in step (b2), adding $HNO_3$ solution into the solid dregs which is containing $Pb(OH)_2$ precipitate to regulate pH value to 0.5-1, reacting $Pb(OH)_2$ with $HNO_3$ to obtain a solution containing $Pb(NO_3)_2$; (b4) adding $SO_4^{2-}$ into the solution containing $Pb(NO_3)_2$ as obtained in step (b3) to precipitate $Pb^{2+}$ to obtain $PbSO_4$; (b5) adding strongly alkaline liquor into the solution containing the $PbSO_4$ precipitate as obtained in step (b4) to regulate pH value to 8-10 to produce $3PbO \cdot PbSO_4 \cdot H_2O$, rinsing and drying the obtained $3PbO \cdot PbSO_4 \cdot H_2O$.

18. The method as claimed in claim 3, wherein, said step (4) comprises: (b1) regulating the pH value of said leachate to 11-12; precipitating $Pb^{2+}$ to obtain $Pb(OH)_2$ precipitate; (b2) filtrating the leachate containing the $Pb(OH)_2$ precipitate as obtained in step (b1), separating solid which is containing $Pb(OH)_2$ precipitate and liquid for removing impurities; (b3) taking solid dregs which is containing $Pb(OH)_2$ precipitate as obtained in step (b2), adding $HNO_3$ solution into the solid dregs which is containing $Pb(OH)_2$ precipitate to regulate pH value to 0.5-1, reacting $Pb(OH)_2$ with $HNO_3$ to obtain a solution containing $Pb(NO_3)_2$; (b4) adding $SO_4^{2-}$ into the solution containing $Pb(NO_3)_2$ as obtained in step (b3) to precipitate $Pb^{2+}$ to obtain $PbSO_4$; (b5) adding strongly alkaline liquor into the solution containing the $PbSO_4$ precipitate as obtained in step (b4) to regulate pH value to 8-10 to produce $3PbO \cdot PbSO_4 \cdot H_2O$, rinsing and drying the obtained $3PbO \cdot PbSO_4 \cdot H_2O$.

\* \* \* \* \*